(12) United States Patent
Wu et al.

(10) Patent No.: US 10,193,924 B2
(45) Date of Patent: Jan. 29, 2019

(54) NETWORK INTRUSION DIVERSION USING A SOFTWARE DEFINED NETWORK

(71) Applicant: ACALVIO TECHNOLOGIES, INC., Cupertino, CA (US)

(72) Inventors: Johnson L. Wu, Sunnyvale, CA (US); Catherine V. Hart, Vancouver (CA); Leo R. Versola, San Francisco, CA (US); Eric Winsborrow, West Vancouver (CA)

(73) Assignee: ACALVIO TECHNOLOGIES, INC., Cupertino, CA (US)

( * ) Notice: Subject to any disclaimer, the term of this patent is extended or adjusted under 35 U.S.C. 154(b) by 80 days.

(21) Appl. No.: 14/847,470

(22) Filed: Sep. 8, 2015

(65) Prior Publication Data

US 2016/0080415 A1     Mar. 17, 2016

Related U.S. Application Data

(60) Provisional application No. 62/051,848, filed on Sep. 17, 2014.

(51) Int. Cl.
*H04L 29/06* (2006.01)

(52) U.S. Cl.
CPC ...... *H04L 63/1491* (2013.01); *H04L 63/1408* (2013.01)

(58) Field of Classification Search
CPC .................................................. H04L 63/1491
See application file for complete search history.

(56) References Cited

U.S. PATENT DOCUMENTS 7,107,347 B1 *  9/2006  Cohen ............... H04L 29/12009
                                                              709/218
8,156,541 B1 *  4/2012  Thomas .............. H04L 63/1491
                                                              726/13

(Continued)

OTHER PUBLICATIONS

Singh, Abhay Nath; Joshi, R.C.; "A Honeypot System for Efficient Capture and Analysis of Network Attack Traffic", International Conference on Signal Processing, Communication, Computing and Networking Technologies, IEEE, Jul. 21-22, 2011, pp. 514-519.*

(Continued)

*Primary Examiner* — Victor Lesniewski
(74) *Attorney, Agent, or Firm* — Kilpatrick Townsend & Stockton LLP

(57) ABSTRACT

Methods, devices, and systems are described for diverting a computer hacker from a physical or other targeted production computer to a decoy software-based host emulator that emulates the physical computer. The decoy has the exact same IP address as the physical computer. In order to avoid packet collisions, a programmable physical switch and a virtual networking switch are employed, both of which can use software-defined networking (SDN). The virtual switch prevents packets from the decoy from flowing out of its virtual network until commanded. Upon a command, the physical switch redirects specific flows to the virtual switch, and the virtual switch opens specific flows from the decoy. The specific flows are those with packets containing the hacker's computer IP address, production computer IP address, and production computer port. The packets are associated with TCP connections or UDP sessions. The decoy host emulator can be a virtual machine (VM) running alongside many other VMs in a single computer. If the hacker performs a horizontal scan of the network, additional flows are diverted to other decoy host emulators.

30 Claims, 8 Drawing Sheets

(56) References Cited

U.S. PATENT DOCUMENTS

| | | | | |
|---|---|---|---|---|
| 8,943,594 | B1* | 1/2015 | Arrowood | G06F 21/53 726/23 |
| 9,038,151 | B1* | 5/2015 | Chua | H04L 45/02 709/223 |
| 9,794,275 | B1* | 10/2017 | Benameur | H04L 63/1416 |
| 9,942,250 | B2* | 4/2018 | Stiansen | H04L 63/1416 |
| 2002/0133717 | A1* | 9/2002 | Ciongoli | H04L 63/1408 726/23 |
| 2004/0078592 | A1* | 4/2004 | Fagone | H04L 63/14 726/22 |
| 2004/0128529 | A1* | 7/2004 | Blake | H04L 63/1491 726/25 |
| 2006/0101515 | A1* | 5/2006 | Amoroso | H04L 29/12009 726/23 |
| 2008/0163354 | A1* | 7/2008 | Ben-Shalom | H04L 63/1441 726/12 |
| 2008/0262990 | A1* | 10/2008 | Kapoor | G06F 9/505 706/20 |
| 2009/0328216 | A1* | 12/2009 | Rafalovich | H04L 43/0876 726/23 |
| 2012/0254951 | A1* | 10/2012 | Munetoh | G06F 21/554 726/4 |
| 2013/0133072 | A1* | 5/2013 | Kraitsman | H04L 63/1408 726/23 |
| 2013/0160079 | A1* | 6/2013 | Hebert | H04L 63/145 726/3 |
| 2013/0242743 | A1* | 9/2013 | Thomas | H04L 63/0227 370/236 |
| 2013/0298236 | A1 | 11/2013 | Smith et al. | |
| 2014/0096229 | A1* | 4/2014 | Burns | H04L 63/1491 726/15 |
| 2014/0101724 | A1* | 4/2014 | Wick | H04L 63/1491 726/4 |
| 2014/0115706 | A1* | 4/2014 | Silva | G06F 9/45533 726/23 |
| 2014/0317684 | A1* | 10/2014 | Porras | H04L 63/20 726/1 |
| 2014/0359708 | A1* | 12/2014 | Schwartz | G06F 15/173 726/4 |
| 2015/0047032 | A1* | 2/2015 | Hannis | H04L 63/1491 726/23 |
| 2015/0058983 | A1* | 2/2015 | Zeitlin | H04L 63/1408 726/23 |
| 2015/0128246 | A1* | 5/2015 | Feghali | H04L 63/0209 726/13 |
| 2015/0188933 | A1 | 7/2015 | Zeitlin et al. | |
| 2015/0358338 | A1* | 12/2015 | Zeitlin | H04L 63/1416 726/23 |
| 2015/0365438 | A1* | 12/2015 | Carver | H04L 63/1441 726/1 |
| 2016/0080414 | A1* | 3/2016 | Kolton | H04L 63/1491 726/23 |

OTHER PUBLICATIONS

More, Asit; Tapaswi, Shashikala; "A software router based predictive honeypot roaming scheme for network security and attack analysis", 9th International Conference on Innovations in Information Technology (IIT), IEEE, Mar. 17-19, 2013, pp. 221-226.*

Pomsathit, Auttapon; "Effective of Unicast and Multicast IP Address Attack Over Intrusion Detection System with Honeypot", Spring Congress on Engineering and Technology, IEEE, May 27-30, 2012, 4 pages.*

The Bait and Switch Honeypot: An active and aggressive part of your network security infrastructure, Internet Archive Wayback Machine, Dec. 30, 2002, https://web.archive.org/web/20040803042041/http:/violating.us/projects/baitnswitch / accessed Aug. 20, 2015.

Lorie W. Carter, Setting Up a Honeypot Using a Bait and Switch Router, SANS Institute InfoSec Reading Room, SANS Security Essentials and the CISSP 10 Domains, Jul. 29, 2004, Orlando, Florida.

Orr Hirschauge, Israeli Cyper-Security Startup GuardiCore Raises $11 Million, Digits Tech News & Analysis from the WSJ, Aug. 18, 2014, pp. 1-2, Dow Jones & Company, Inc.

* cited by examiner

NETWORK INTRUSION DIVERSION USING A SOFTWARE DEFINED NETWORK

CROSS-REFERENCES TO RELATED APPLICATIONS

This application claims the benefit of U.S. Provisional Application No. 62/051,848, filed Sep. 17, 2014, which is hereby incorporated by reference in its entirety for all purposes.

STATEMENT AS TO RIGHTS TO INVENTIONS MADE UNDER FEDERALLY SPONSORED RESEARCH AND DEVELOPMENT

NOT APPLICABLE

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Art

The technology described here generally relates to computer networking, and, more specifically, to network intrusion diversion using software defined networking (SDN).

2. Description of the Related Art

Businesses, governments, and other organizations have seen their computer networks expand to enable internal communication among employees' computers as well as with customers/clients, vendors and suppliers, the general public, and others outside the organizations through the Internet. Computer networks have become more difficult to protect as they grown in size and complexity.

Network application server hosts often find themselves a target for attackers trying to steal information, disable services, and/or use the exposed services as a beachhead for further intrusion and infiltration. Conventional protection mechanisms include anti-distributed denial of service (DDOS) attack schemes (by prevention of data flood overflows), inline anti-virus (AV) scanning (i.e., signature-based malware matching), and sophisticated multi-factor authentication. When the tracks of a hacker are spotted, the account that the hacker is using is summarily locked out.

While the focus of these measures is to stop the attacker from intrusion, there is little consideration for observing an attacker's subsequent activities and motives once it gains a foothold on the server host. The hacker knows when he is found out because he or she is locked out. He or she may be able to correlate the behavior that led to the lockout because they are closely related in time. Further, the hacker can immediately try a different account or back door and avoid the behaviors that led to discovery. Thus, hackers learn how to avoid detection better with each break-in, often with impunity.

There is a need in the art for more efficient protections against hackers of computer systems.

BRIEF SUMMARY OF THE INVENTION

Generally, methods, devices, and systems are described for a dual switch intrusion diversion network system with virtual, decoy nodes. A physical switch, which connects an enterprise's normal production network, is connected with a virtual switch, behind which are virtual decoy nodes. When a hacker's unauthorized attempts to access a node on a production network are identified, the hacker's attempted connection is actively diverted by the physical switch to the virtual switch. The decoy nodes can be near-identical clones of the original production target computers but populated with false data. Moreover, the decoy nodes can have the same IP addresses as the production nodes that they emulate. The virtual switch, in cooperation with the physical switch, prevents collisions between packets from the production computer and packets from the emulated node with the same IP address. The hacker establishes a connection with the decoy node and not the production node, unaware of the redirect because the IP addresses of the nodes are exactly the same. Multiple production computers can be emulated as decoy computers using high-interaction virtual machines (VMs) or low-interaction virtual hosts. Nodes in the decoy network can be instantiated upon a hacker being detected and redirected or earlier depending on the threat level.

Such a decoy node can be hosted in a false apparent network, for example such as one described in U.S. Pat. No. 9,021,092, issued Apr. 28, 2015. The intruder can then be contained in the false apparent network where his subsequent activities will be observed. Correlated data can then be used for remedial and preventive action to be taken on other production network security appliances and software.

Some embodiments of the present invention are related to a method of diverting an intruder in a computer network. The method includes receiving an indication that a first connection from a user's computer is suspicious, the first connection being between the user's computer and a production host computer through a physical switch, wherein Internet Protocol (IP) packets associated with the first connection have a user IP address associated with the user's computer, a host IP address associated with the production host computer, and a host port associated with the production host computer, instantiating and initializing a software-based host emulator behind a virtual switch, the host emulator configured to respond to an address resolution protocol (ARP) request for the host IP address, commanding the physical switch to redirect subsequent flows with the user IP address, the host IP address, and the host port between the user's computer and the virtual switch, instructing the virtual switch to allow packets with the user IP address, the host IP address, and the host port to flow to the physical switch, forwarding, through the virtual switch, a request for a second connection to the host emulator, and establishing, at the host emulator, the second connection between the user's computer and the host emulator, the second connection flowing through the production and virtual switches.

The receiving, instantiating and initializing, commanding, instructing, forwarding, and establishing can occur within a single, rack-mounted server. The instantiating and initializing of the software-based host emulator can be triggered when the indication is received. The instantiating and initializing of the software-based host emulator can include instantiating and initializing a virtual machine. The method can further include identifying an operating system (OS) used by the production host computer, and configuring the virtual machine to emulate portions of the identified operating system. Also, the method can include ascertaining an enterprise software service provided by the production host computer, and configuring the virtual machine to emulate portions of the ascertained enterprise software service.

The method can include receiving an indication that the user's computer is legitimate, commanding the physical switch to redirect subsequent flows with the user IP address, the host IP address, and the host port to the production host computer, and instructing the virtual switch to block packets with the user IP address, the host IP address, and the host port from flowing to the production switch.

The method can include ascertaining IP addresses of other host computers on a local area network (LAN) on which the production host computer is connected, and instantiating and initializing additional software-based host emulators behind the virtual switch, the additional software-based host emulators configured to respond to an ARP requests for IP addresses of the other host computers. The method can further include detecting, by a security information and event management (SIEM), a horizontal scan of the other host computers on the LAN, commanding the physical switch to redirect requests for connections from the user IP address to the virtual switch, and instructing the virtual switch to allow packets with the user IP address from the additional software-based host emulators to flow to the physical switch. The method can include detecting, by a security information and event management (SIEM), a vertical scan of ports of the host emulator, commanding the physical switch to redirect subsequent flows with the user IP address, the host IP address, and other host ports between the user's computer and the virtual switch, and instructing the virtual switch to allow packets with the user IP address, the host IP address, and other host ports to flow to the physical switch.

The method can include classifying as suspicious, by a security information and event management (SIEM), at least one interaction in the first connection, and logging the user IP address to a database based on the classifying. The physical switch and the virtual switch can be software defined networking (SDN) capable switches. The commanding and instructing can be implemented using virtual local area network (VLAN) tagging.

The production computer can include a physical computer or a virtual machine. The method can include ascertaining whether the first connection was terminated by the production host computer, and sending a transmission control protocol (TCP) reset to the user's computer based on the ascertaining. The first connection can be a transmission control protocol (TCP) connection or a user datagram protocol (UDP) session. The method can include receiving, at the physical switch, a request for the second connection from the user's computer to the production host computer, redirecting, through the physical switch, the request for the second connection to the virtual switch based on the commanding, the physical switch inhibiting the request for the second connection from proceeding to the production host computer.

Non-transitory machine-readable media may provide instructions that when read by a machine having a processor and a memory cause the machine to perform operations according to the methods of the present disclosure.

Yet other embodiments relate to systems executing the above-referenced methods and non-transitory machine-readable storage media that employ or store instructions for the methods described above.

This summary is not intended to identify key or essential features of the claimed subject matter, or is it intended to be used in isolation to determine the scope of the claimed subject matter. The subject matter should be understood by reference to appropriate portions of the entire specification of this patent, any or all drawings, and each claim.

DETAILED DESCRIPTION OF THE INVENTION

Figure 1:
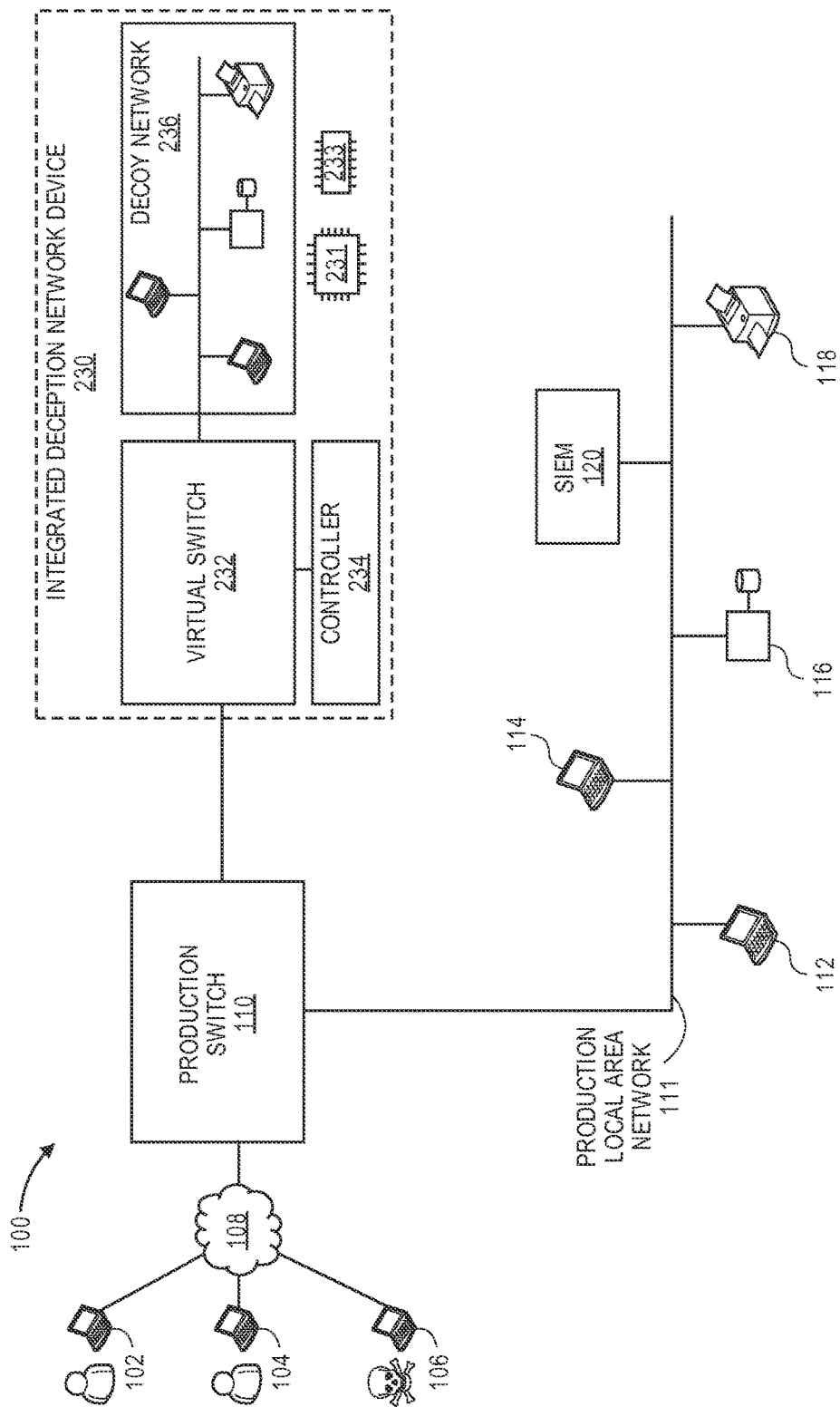
FIG. 1 illustrates an active production computer network connected with a network diversion system in accordance with an embodiment.

In the methods, devices, and systems described, an inline device, sometimes referred to as an access switch or physical switch, akin to a software defined networking (SDN) data plane, sits between the servers and the network ingress from which clients will access services hosted on such servers. During normal operation, the clients are allowed to access certain ports offering hosted services on such servers.

An SDN controller, such one conforming to OpenDaylight® standards, can be configured to control flows across the inline device. Sample actions include stalling or resetting flows of connections from a certain source Internet protocol (IP) (client) to a certain destination IP (server), and setting up new flows from a certain source IP address to an alternative destination than the one originally specified in the originating packets.

A false apparent network can be set up in an appliance, virtual or otherwise, with hosts contained therein that mirror those in the production server segment with overall configuration for close mimicry. Host types, services, and IP addresses can be identical to those on the production segment.

The hosts can operate as if they were production (i.e., real, physical) servers, albeit configured with slightly easier access and/or intentional vulnerabilities (e.g. older, known-compromised versions of network services) compared to their counterparts in production.

In order to prevent IP address conflicts, the IP addresses internal to the false apparent network can be segregated from the production network/Internet via a network address translation (NAT) system, have limited access via flow-based SDN controls, or have no access at all. For security reasons, the false apparent network can be hosted with tightly controlled, limited and monitored access to the production network and/or the Internet.

While there may be little-to-no differentiation between a normal client and one that is operated by a malicious attacker at the start of any connection, a client IP address is flagged as suspicious when certain conditions are met. Examples of such conditions include server logs of password guessing attempts, intrusion detection system (IDS) logs of suspicious activity including denial of service (DOS) or buffer overflow exploits, and many more. These will be referred to as Indicators of Compromise (IOCs), and span a vast array of exploits against systems, components, and services.

Once a suspicious source IP address is flagged as a result of a single or multiple IOC's, an event is logged from the intrusion detection system or application server to a Security Information and Event Management (SIEM) system, which will recognize the event via a pre-configured rulebase and then trigger an action on an SDN controller. The existing connection from the suspicious client (if TCP is used) will be stalled/delayed (i.e. intentionally rate-limited), dropped, or reset using SDN feature sets.

For example, a TCP reset can be sent to the suspicious client if it is ascertained that the existing connection was not terminated (with its own TCP reset) by the production host computer.

An attempt from the same source IP to reconnect to the production host computer is diverted to an equivalent IP address hosted by an instance of a virtual host inside the false apparent network. The diversion can be achieved by an SDN flow setup between the production switch and a virtual switch within the device hosting the false apparent network. Once a suspicious source IP is identified and confirmed via correlation rules within an SIEM or other such analytics applications, the SDN controller can create flow rules on the access switch and the virtual switch within the false apparent network appliance. The intruder's subsequent connection or data transmission to the original target server can be diverted to a decoy host whose IP address is the same as the original intended target.

Since the decoy host can be configured to be a near-identical clone of the original target, including the same IP address, the attacker ideally will assume successful intrusion into the intended server and continue to operate. From this point, the subsequent actions and activities of such attacker will be logged, observed, and analyzed. Any binaries created or introduced into the decoy system can be marked as 'suspicious.' Signatures, such as YARA rules, (which describe and instantiate rules for IOCs) can be created for distribution to production security devices for access control or remedial action.

Because heuristics are sometimes used to determine whether a source is suspect or otherwise, there is always the possibility of a legitimate user being diverted to the decoy system. For this and other reasons, a rollback mechanism can be put in place to revert a flow rule back to original, such that a source IP address with a user previously/erroneously thought to be malicious can resume access to the production servers.

For example, after an indication is received that a user's computer is legitimate, the physical access switch can be commanded to redirect subsequent flows that have the user IP address, the host IP address, and the host port on to the production host computer. Further the virtual switch can be instructed to block packets with the user IP address, the host IP address, and the host port from flowing to the production switch or otherwise out of the decoy network.

Aspects of the System

Different aspects of certain processes of embodiments are described below.

1. One can create a near-clone of a production server network with all its servers and hosted services using Software-Defined Networking (SDN) and/or a Virtual Machine (VM) by surveying a network segment and collecting information about existing server hosts and topology.

An "auto discovery" procedure can involve using tools such as nmap and the like to create an inventory of live hosts. For example:

detected live hosts
   192.168.123.11-31,
fingerprinted hosts
   192.168.123.11: Win7,
   192.168.123.12: Debian.

A table of discovered hosts on a particular surveyed segment can be displayed to an administrator or other user, and an option is presented to choose whether near-duplicates of these hosts shall be spun up and hosted inside the virtual network to serve as decoys without broadcasting themselves to the production segment, i.e. not responding to Address Resolution Protocol (arp) requests on the production side, yet responding to arp requests by VMs within that same segment without a pre-existing arp entry of such hosts. The near-duplicates may respond to an arp request, but their responses may be contained within the virtual network by a virtual switch or physical switch.

Use Case 1: An attacker from IP address A1 tries to access application server RH1 (real host 1) via production SDN-capable switch SS1. RH1 has server logs recording repeated unsuccessful logins to RH1. RH1 sends logs to production SIEM. An agent that reads the production SIEM logs can verify the status of the equivalently addressed hosts on the obfuscation segment. If not present, the agent will set up and assign dedicated a VM (SH1) with the same services with the same IP address as RH1. The agent will also send an SDN control command to SS1 to enumerate the number of existing connections from A1 to RH1. If no legitimate connections from A1 to RH1 are present, the agent can divert the offending flow and subsequent flows from the same source IP address A1 to SH1.

2. One can host such a network privately without causing IP address conflicts with the production segment, yet offer on-demand privileged access from certain definable source IP addresses controlled via an SDN controller, such as one conforming with OpenDaylight® standards. Software Defined Networking can be used to replicate the real production network while suppressing the IP networking conflicts typically associated with duplicated IP resources such IP and MAC (media access control) addresses.

Use Case 2: An attacker from IP address A2 tries to send scanning connections to RH1 (real host 1) via production SDN-capable switch SS1. SS1 and/or RH1 senses scans to RH1. SS1/RH1 sends notification of being scanned to production SIEM. An agent that reads the production SIEM logs will assign dedicated a shared VM (SH2) with the same services with a private IP address. The agent can also send an SDN control command to SS1 to enumerate the number of existing connections from A1 to RH1. If no legitimate connections from A1 to RH1 are present, the agent will assign an SDN flow with destination IP address rewritten to divert the offending flow and subsequent flows from the same source IP address A1 to SH2. In this case SH2 can effectively serve to absorb attacks targeted at multiple IP addresses.

3. One can define whether each of these false apparent hosts will be serviced by an individual VM instance or allow multiple false apparent hosts of the same operating system (OS) type to be serviced by a single VM with a reserved IP. In the latter case, SDN traffic control features can be used to steer the incoming connections with destination NAT handling and other SDN-specific features, such as L2 (Layer 2)

rewrite and VLAN tagging to enable the presentation of multiple IP addresses to clients running on other VM in such virtualized environment.

4. One can accept correlated data relayed as a trigger from an SIEM system or other appropriately enabled devices. Using such data, one can create temporary flow rules on inline SDN capable switches and devices and the SDN-enabled network switches within the intrusion obfuscation appliance.

5. One can create and manage special flow rules using an SDN control plane device on a per source IP dest IP, source port, dest port, protocol tuple. This can be done to temporarily and covertly divert flows to user-specified ports on SDN data plane devices.

Detailed Description Using the Drawings

FIG. 1 illustrates an active production computer network connected with a network diversion system in accordance with an embodiment. Users 102, 104, and 106 connect through wide area network (WAN) 108, such as the Internet, and company firewalls and demilitarized zone(s), to the company's computer network 100. User 106 is an illegitimate user—a "hacker."

A "production network" includes a company's computer network on which normal business operations are run by legitimate, authorized users, or as otherwise known in the art. A "production computer," "production switch," or other "production" device includes a device that is used in the ordinary course of business, available for non-hacker deception purposes, or as otherwise known in the art.

Production switch 110 is a physical switch that is programmable using software defined networking (SDN) and is thus SDN capable. In the exemplary embodiment, the SDN aspects of the switch are implemented using the syntax of the OpenFlow® standard. Behind the production switch is production local area network (LAN) 111 upon which the company's operating computer network resides. Production host computers 112, 114, 116, and 118 are shown. Host computers 112 and 114 are personal computers while host computer 116 is a server computer. Host computer 118 is resident in printer 118 as its operating circuitry for connecting the printer to the network.

Security information and event management (SIEM) computer 120 is also connected with LAN 111. SIEM 120 sniffs network activity and detects suspicious connections. SIEM 120 can use correlation techniques to detect active threats automatically. While consisting of many tools, SIEM 120 generally refers to those capable of gathering, analyzing, and presenting information, managing vulnerabilities and policy compliance, and logging operating system and database operations. When it determines that an interaction, such as a TCP connection or UDP session, is suspicious, SIEM 120 classifies the interaction as suspicious and logs it to a database. SIEM 120 can also automatically inform other devices of a real-time infiltration being performed by a hacker.

Also behind production switch 110 is integrated deception network device 230. It is "integrated" because it is housed in one chassis box on a single server. A server can include at least one computer processor 231 and memory 233. Integrated deception network device 230 includes virtual switch 232, controller 234, and decoy network 236, which is composed of virtual host computers. The "virtual" computers are not computers in separate boxes but instead are software-based host emulators that each simulate a computer.

Figure 2:
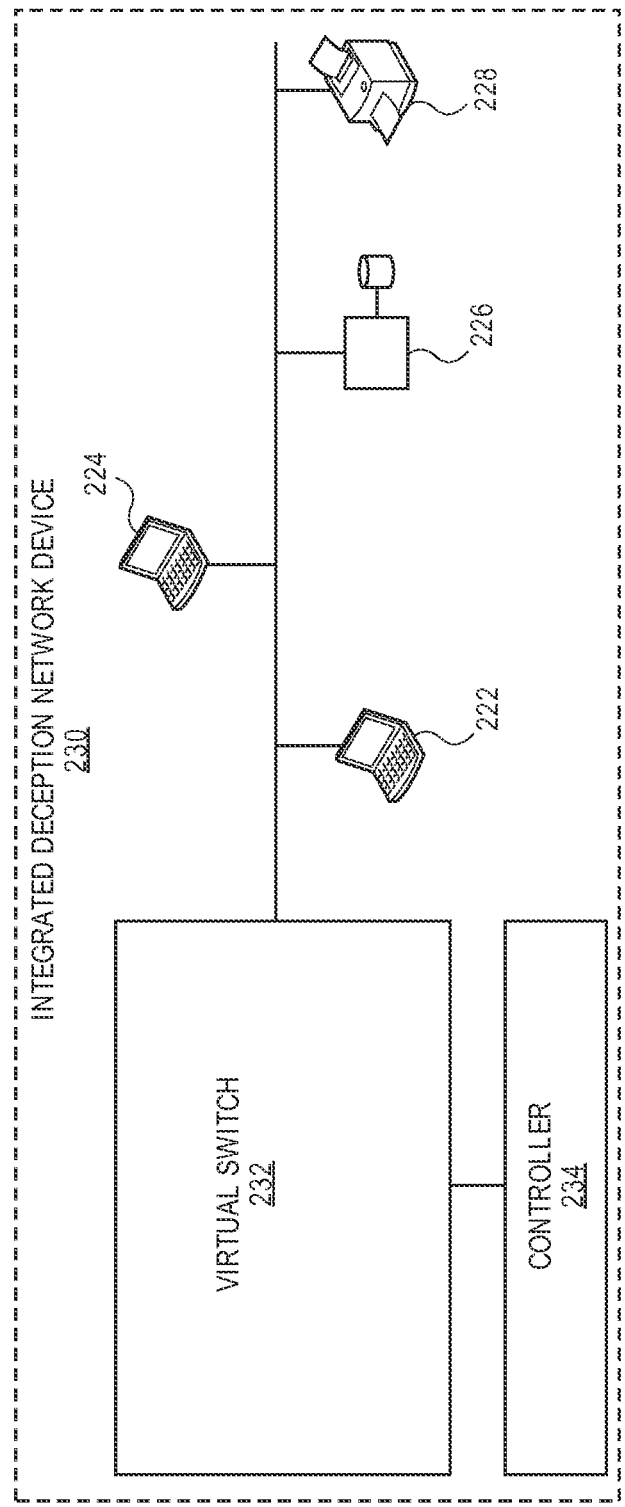
FIG. 2 illustrates an integrated deception network device of the network diversion system of FIG. 1.

FIG. 2 illustrates integrated deception network 230 device of the network diversion system of FIG. 1. Behind virtual switch 232 are software-based host emulators 222, 224, 226, and 228. Each host emulator mimics a real, production host computer. High-interaction host emulators are composed of virtual machines (VMs) that emulate at least a portion of an identified operating system used by the corresponding production host. They can also be configured to offer the same enterprise software services that are running on the production host, such as lightweight directory access protocol (LDAP) services, user-authentication and security services, enterprise content management services, information technology (IT) service management, and web services.

Low-interaction host emulators take less memory than high-interaction hosts. The low-interaction host emulators are programmed to respond to very simple levels of probing. Perhaps one of the simplest responses is to respond to an Internet control message protocol (ICMP) echo request packet or an address resolution protocol (ARP) request for the host IP address. This response to a core protocol is recognized to exist across virtually all TCP/IP-enabled devices, from simple emulators to complex servers.

Host emulator 222 emulates production PC host 112, and host emulator 224 emulates production PC host 114. Host emulator 226 emulates production server host 116, and host emulator 228 emulates production printer host 118. For each of the host emulators, an OS of the corresponding production host can be identified by lookup table, real-time determination, or otherwise. A virtual machine of the host emulator can then be configured emulate portions of the identified OS of the corresponding host.

When a message with an indication from SIEM 120 is received by integrated deception network device 230 that a connection between hacker 106 through production switch 110 to production host 112 (FIG. 1) is suspicious, controller 234 directs the instantiation and initialization of software-based host emulator 222. Host emulator 222 takes the same IP address as production host 112. The IP address can be received with the user IP address of hacker's computer 106 and port that the hacker's computer is using to connect.

Because host emulator 222 now has the same IP address as production host 112, on a non-switched network there is a danger of packet collisions. However this is cleverly avoided by the physical and virtual switches. Integrated deception network device 230 commands physical production switch 110 to redirect subsequent flows of packets that have the hacker's IP address, the host IP address, and the host port to flow between the hacker's computer 106 and virtual switch 232.

Meanwhile, the virtual switch is instructed to allow packets with the hacker's IP address, host IP address, and host port to exit out from decoy network 236 through virtual switch 232 out to physical production switch 110.

If it is ascertained that production host computer 112 has not terminated the hacker's connection, a TCP reset can be sent to hacker's computer 106 by integrated deception network device 230 in order to ensure that the connection between hacker computer 106 and production host computer 112 is closed.

A "connection" can include a transmission control protocol (TCP) connection, user datagram protocol (UDP) session, or other protocol-based connection between two or more computers as understood in the art. The requisite details of the connection are preferably, but not necessarily, at layer 3 and higher of the open systems interconnection (OSI) model, commonly called the Internet protocol (IP) layer in networks that are connected with the Internet.

At physical production switch 110, a request might be received from hacker computer 106 for another connection to production host computer 112. However, physical switch 110 redirects the request for the new connection to virtual switch 232 based on the command earlier to redirect flows. Not only is the request redirected to virtual switch 232, but the physical switch inhibits the request from proceeding to the production host computer as it otherwise normally would if it were not for the command.

Virtual switch 232 forwards the request for the second connection to host emulator 222. At host emulator 222, the second connection is established between hacker's computer 106 and itself by sending appropriate data packets from host emulator 222 through virtual switch 232 and production switch 110 to hacker's computer 106.

If it is determined that the user is not a hacker but rather is a legitimate user, the sequence can be reversed. Integrated deception network device 230 can command the physical production switch 110 to redirect subsequent flows with the user computer's IP address, the host IP address, and the host port to the production host computer, and it can instruct virtual switch 232 to block packets with the user IP address, the host IP address, and the host port from flowing to physical production switch 110. It can also command host emulator 222 to close down in order to unload it from memory.

Figure 3:
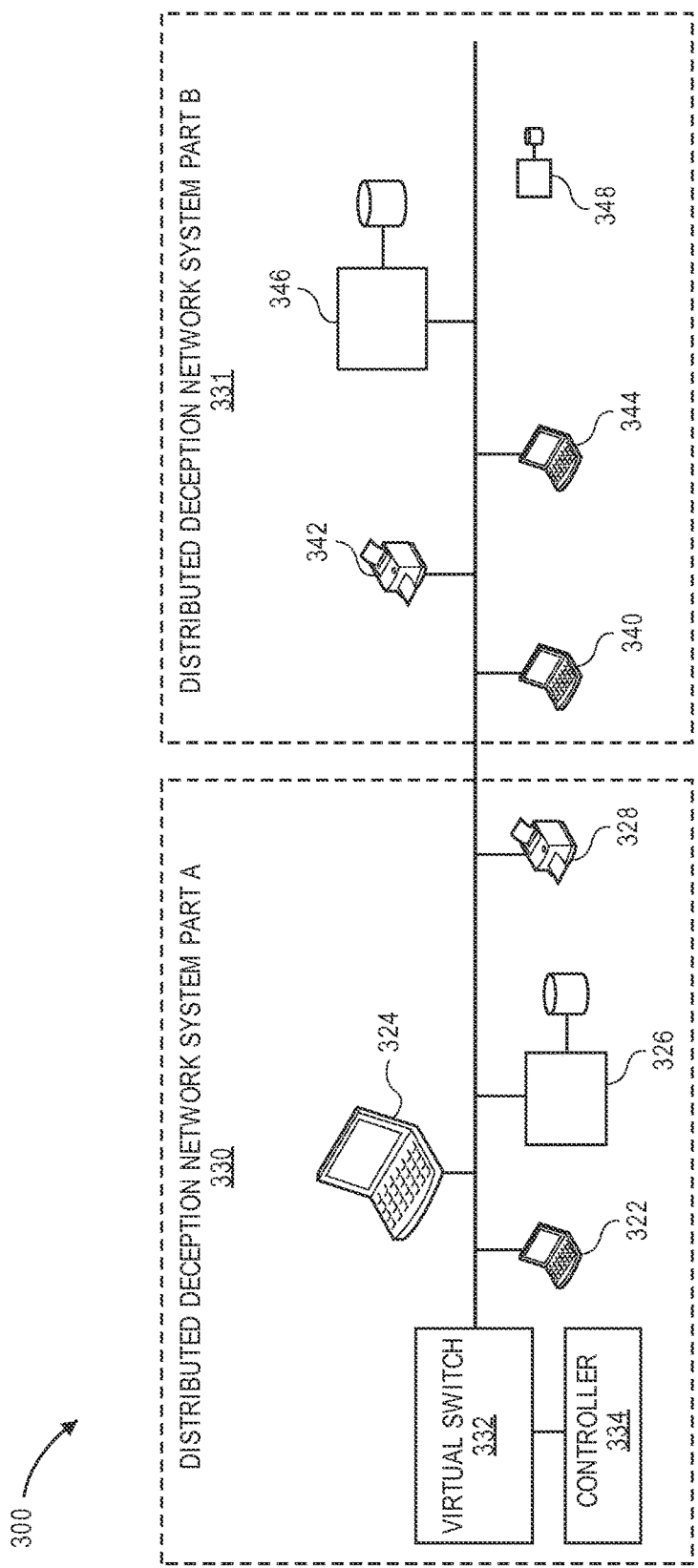
FIG. 3 illustrates a distributed deception network system in accordance with an embodiment.

FIG. 3 illustrates distributed deception network system 300 in which the deception network is distributed among multiple servers 330 and 331. In server 330, virtual switch 332, controller 334, and a subset of the decoy network operate. In server 331, other portions of the decoy network operate. An advantage of distributing the decoy network among two or more server computers is so that more host emulators can operate and/or higher interaction hosts can operate.

In server 331, low interaction hosts 322 and 328 are loaded as simple emulators that respond to ARP requests and no more. High interaction hosts 324 and 326 are virtual machines that emulate a production workstation and web server, respectively. In server 331, low interactions hosts 340, 342, 344, and 348 are loaded while high interaction host 346 emulates a database server.

Other types of servers can be emulated besides web and database servers, such as file servers, mail servers, print servers, gaming servers, and application servers.

One contemporary server can emulate as high-interaction decoys about 10-30 Microsoft Windows-based servers or about 10-100 Linux-based servers using virtual machines. The same server can emulate thousands of low-interaction decoy host emulators because of the lesser load. Multiple servers can be used to add emulated hosts to the decoy network. Different servers can host their own virtual switches, virtual routers, and other virtual 'equipment' to reflect the actual topography of the production network. Different hosts on the network can be initialized at times that reflect the time of day that the corresponding hosts would be booted up by users, randomly seeded so that actual and virtual hosts are extremely difficult to distinguish based on startup times alone.

Figure 4:
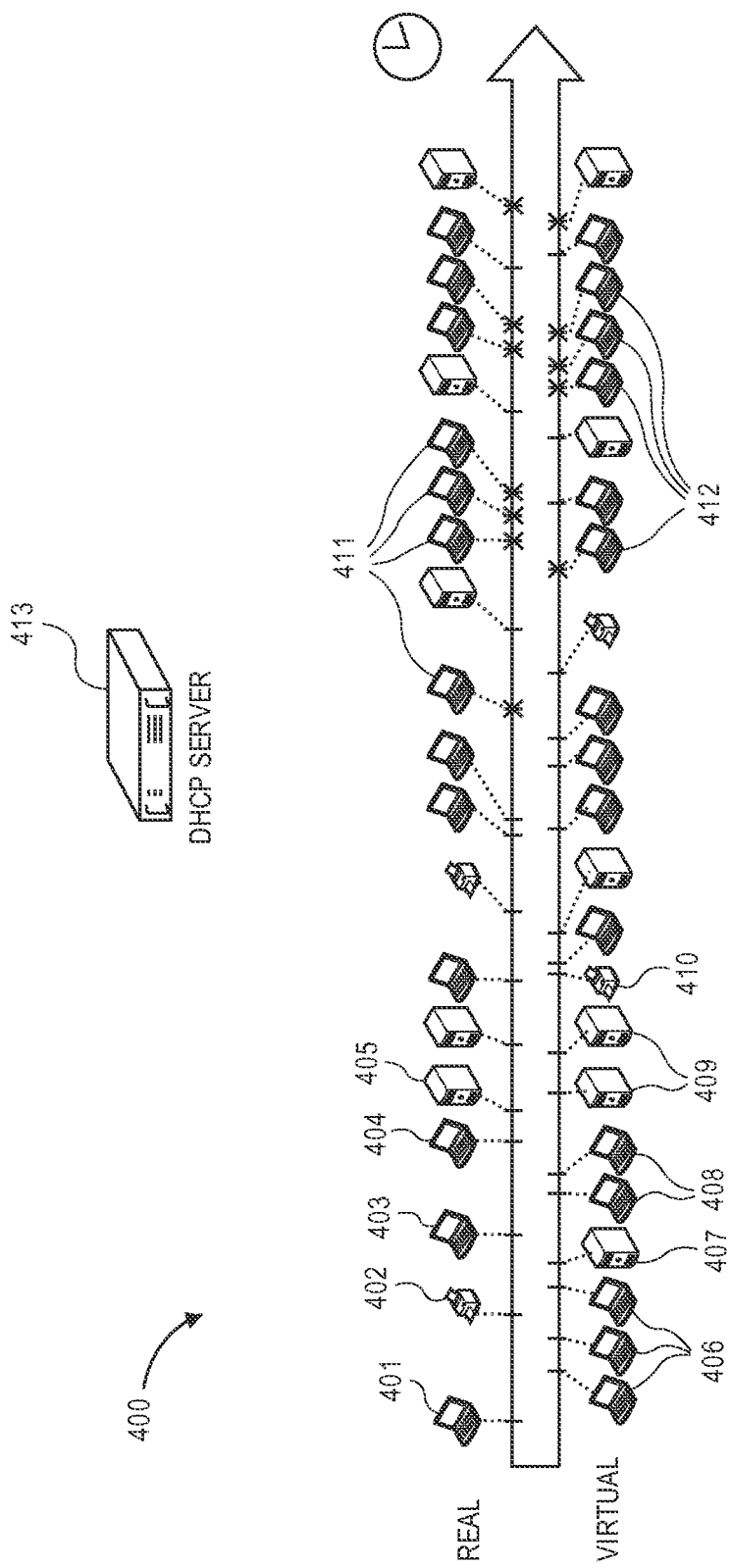
FIG. 4 illustrates a timing diagram of real, physical computers and host emulators being connected to a network in accordance with an embodiment.

FIG. 4 illustrates a timing diagram of real, physical computers and host emulators being connected to their respective networks. In schedule 400, the connection of real and virtual computers to a network are interleaved together, and the IP addresses that are obtained from Dynamic Host Configuration Protocol (DHCP) server 413 reflect the sequence of connections. Time increases to the right.

A "real" computer in this context is synonymous with a physical computer in the production environment. A "virtual" computer in this timeline's context is synonymous with a host emulator, virtual computer, application container, shadow host, or other virtual computer that exists entirely in software.

At a first point in time, physical computer 401 is turned on and connected to the network, followed by printer 402 and computers 403 and 404. Server 405 and other devices are subsequently activated and connected to the network.

Interleaved with the connection times of the real devices are the connection times of host emulators. After computer 401 is activated but before computer 403 is activated, three host emulators 406 are connected to the network. Virtual desktop computer 407 is connected soon after real printer 402. Host emulators 408 are connected soon after physical computer 403 is connected, and host emulators 409 are connected randomly around the timeframe that physical server 405 is connected. Virtual printer 410 is connected as well, prior to another physical printer being connected.

These connection times are randomly interleaved so as to confuse hackers. A hacker may monitor activity on a network over the course of a day to determine when certain computers are on or off and when the busiest times in an office are. By randomly interleaving virtual and real laptops, servers, printers, mobile devices, and other computers with each other, it become difficult, if not impossible, for a hacker to immediately determine which devices are fake and which are real.

If a horizontal scan of the network is detected by SIEM 120 (FIG. 1), physical production switch 110 can be commanded to redirect all requests for connections from the hacker computer's IP address to the virtual switch, and the virtual switch can be instructed to allow packets from the hacker's computer (with the user IP address) to flow to the host emulators.

If a vertical scan of a host computer, i.e., of different ports of the computer, is detected by SIEM 120 (FIG. 1), then physical production switch 110 can be commanded to redirect subsequent flows with the hacker computer's IP address, the host computer's IP address, and other ports to flow to the virtual switch. The virtual switch can be instructed to allow such packets from the hacker's computer (with the user IP address) to flow to the host emulator and back again.

The commanding of the physical switch and instructing of the virtual switch can be implemented using virtual local area network (VLAN) tagging.

Disconnections from the network are also interleaved so as to create a realistic environment. For example, as real people turn off their real computers 411 at the end of a workday, virtual host emulators 412 are disconnected from the network around the same time, interleaved with the disconnections of physical computers 411.

Figure 5:
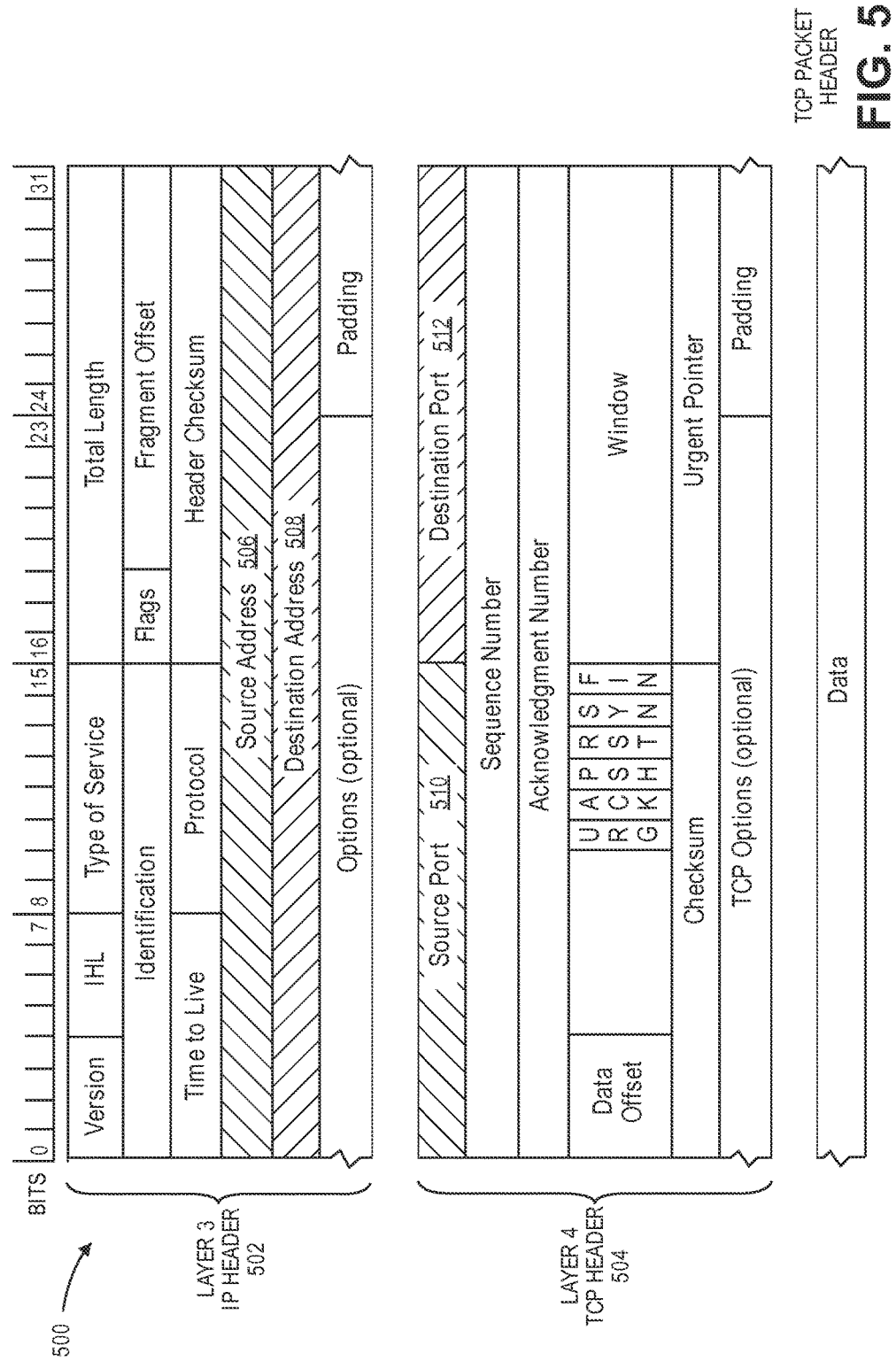
FIG. 5 illustrates a transmission control protocol (TCP) packet header in accordance with an embodiment.

FIG. 5 illustrates a transmission control protocol (TCP) packet header 500 in accordance with an embodiment. OSI layer 3 IP header 502 includes source address field 506 and destination address field 508. OSI layer 4 TCP header 504 includes source port field 510 and destination port field 512.

For packets that flow from a user's computer to a host computer or emulator, the IP address of the user's computer is in source address field 506, and the IP address of the host computer or emulator is in destination address field 508. The port being used by the user's computer is in source port field 510, and the port being connected to at the host computer or emulator is in destination port field 512.

One of ordinary skill in the art would recognize that in packets flowing the opposite direction, i.e. from the host computer or emulator to the user's computer, the IP addresses and ports are swapped between the source and destination fields. It is by reference to these packet header fields that a deception network device can command and/or instruct the physical and virtual switches.

Figure 6:
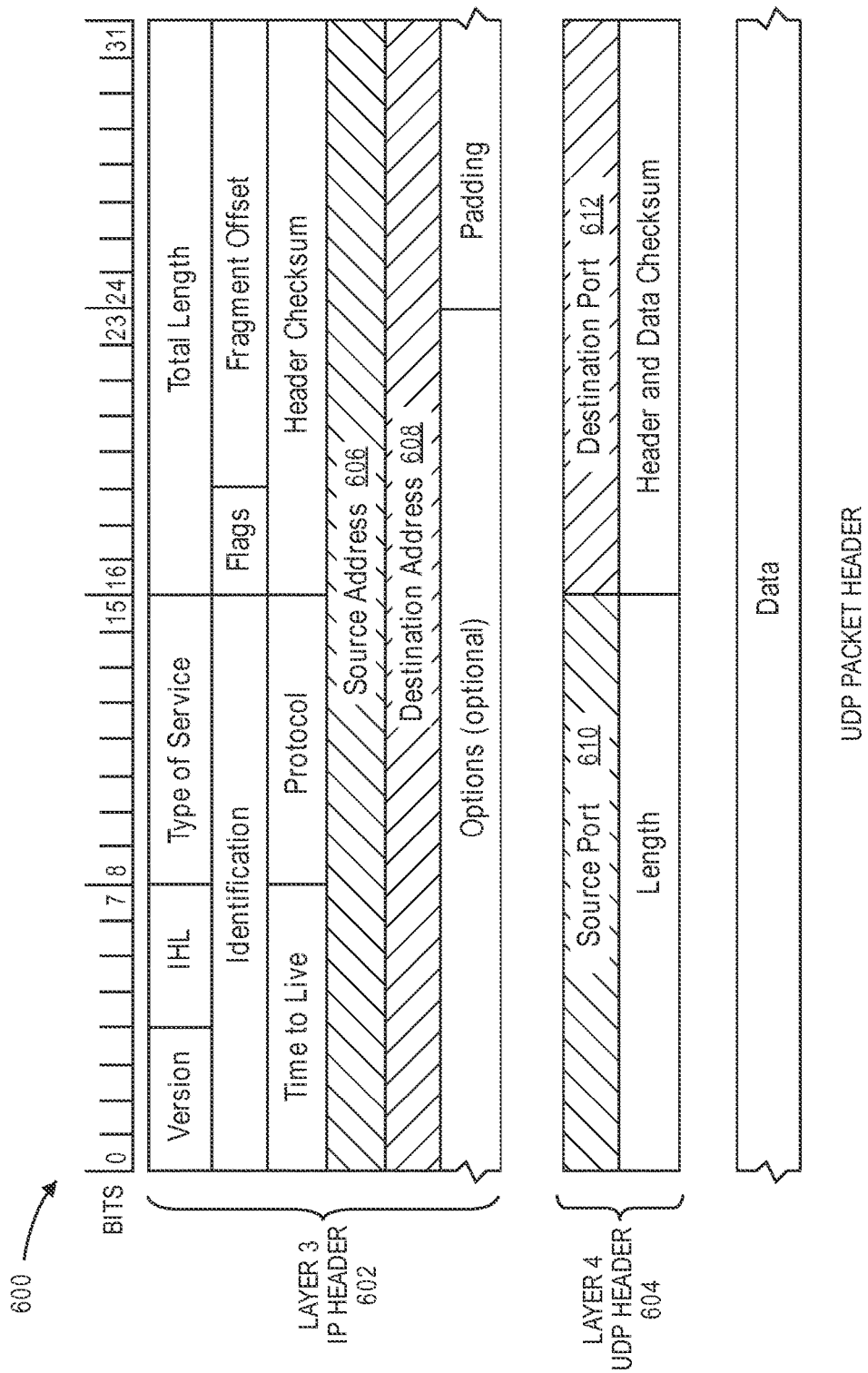
FIG. 6 illustrates a user datagram protocol (UDP) packet header in accordance with an embodiment.

FIG. 6 illustrates a user datagram protocol (UDP) packet header in accordance with an embodiment. As in the previous figure, OSI layer 3 IP header 602 includes source address field 606 and destination address field 608. OSI layer 4 UDP header 604 includes source port field 610 and destination port field 612.

The manner of the source and destination IP addresses and ports for UDP sessions is the same as that for TCP connections as described above.

Figure 7:
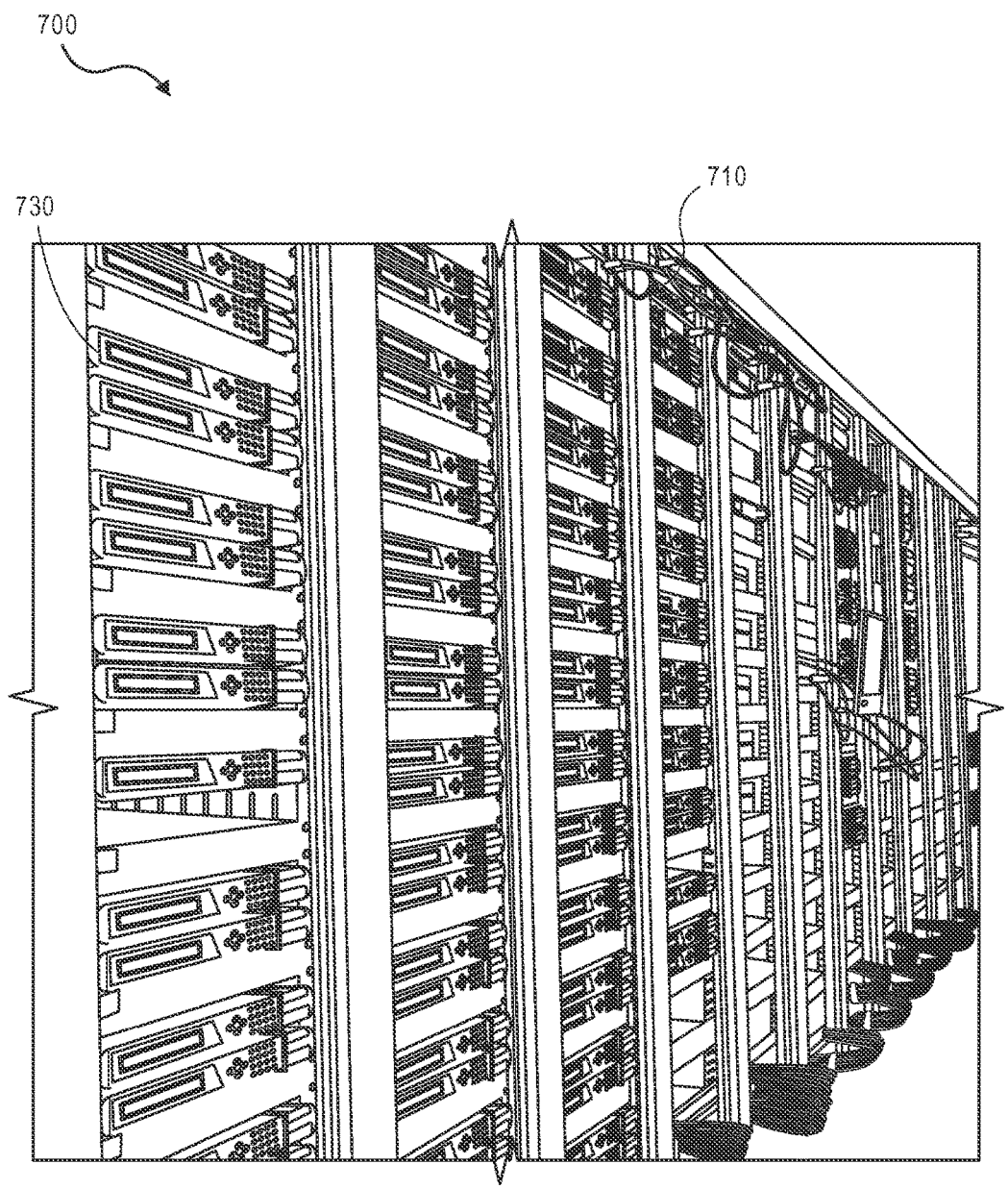
FIG. 7 illustrates a rack-mounted integrated deception network server in accordance with an embodiment.

FIG. 7 illustrates a rack-mounted integrated deception network server in accordance with an embodiment. In computer system 700, integrated deception network device 730 is in one server box. It is physically connected by a 1000Base-T cable to production switch 710, which is a few rack bays away in the figure. Within the single server of integrated deception network device 730, a vast decoy network of high- and low-interaction host emulator can be instantiated. A virtual switch within the same device switches packets to each host emulator, and a controller within device 730 responds to a SIEM by sending command messages across the copper cable to remote production switch 710.

Figure 8:
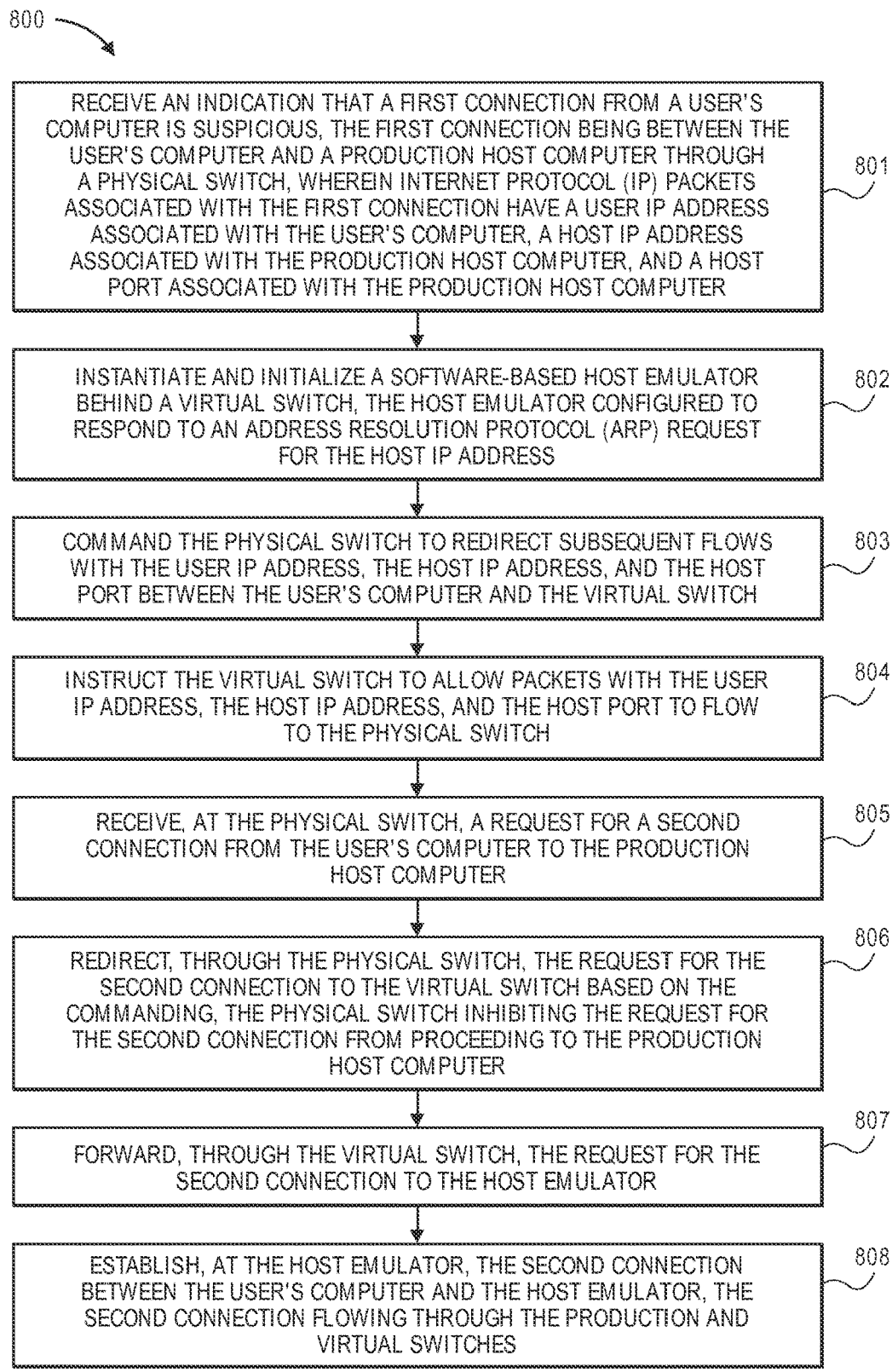
FIG. 8 is a flowchart illustrating a process in accordance with an embodiment.

FIG. 8 is a flowchart of a process in accordance with an embodiment. Process 800 can be implemented wholly or partly in one or more computing devices. In operation 801, an indication that a first connection from a user's computer is suspicious is received, the first connection being between the user's computer and a production host computer through a physical switch. Internet Protocol (IP) packets associated with the first connection have a user IP address associated with the user's computer, a host IP address associated with the production host computer, and a host port associated with the production host computer. In operation 802, a software-based host emulator is instantiated and initialized behind a virtual switch. The host emulator is configured to respond to an address resolution protocol (ARP) request for the host IP address. In operation 803, the physical switch is commanded to redirect subsequent flows with the user IP address, the host IP address, and the host port between the user's computer and the virtual switch. In operation 804, the virtual switch is instructed to allow packets with the user IP address, the host IP address, and the host port to flow to the physical switch. In operation 805, the physical switch receives a request for a second connection from the user's computer to the production host computer. In operation 806, the physical switch redirects the request for the second connection to the virtual switch based on the commanding, the physical switch inhibiting the request for the second connection from proceeding to the production host computer. In operation 807, the virtual switch forwards the request for the second connection to the host emulator. In operation 808, the host emulator establishes the second connection between the user's computer and the host emulator, the second connection flowing through the production and virtual switches.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "non-transitory computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for diverting a client device from a production device in a network, the method comprising:

receiving, at a deception network device, an indication that a connection is suspicious, wherein the connection is a protocol-based network connection between the client device and the production device, and wherein the production device has an Internet Protocol (IP) address;

stalling the connection to divert communications over the connection to a decoy host on a host emulator, wherein the connection is stalled in response to receiving the indication, wherein stalling causes the client device to terminate the connection;

receiving a reconnection request for the client device to reconnect to the production device, wherein the reconnection request is received after the connection is stalled;

determining a configuration of the production device;

configuring the host emulator using the configuration, wherein configuring the host emulator includes assigning the IP address of the production device to the decoy host, and wherein, when configured, the decoy host has a similar hardware and software configuration as the production device; and requesting redirection of the reconnection request to the host emulator, wherein requesting redirection facilitates a second connection between the client device and the host emulator, and wherein the host emulator enables an appearance of a successful intrusion into the production device by the second connection.

2. The method of claim 1, wherein the connection is stalled on behalf of the production device.

3. The method of claim 1, wherein, after configuring the host emulator, both the host emulator and the product device are configured with the IP address.

4. The method of claim 1, wherein a physical switch connects the network with a virtual switch, wherein the host emulator is connected to the virtual switch, and wherein the physical switch determines whether to forward packets for the IP address to the network or the virtual switch.

5. The method of claim 4, further comprising:
configuring the physical switch to divert packets sent by the client device, wherein a packet for the IP address that is sent by the client device is diverted to the virtual switch, wherein a packet for the IP address that is sent by a different client device is forwarded to the network, and wherein the physical switch is configured in response to receiving the indication that the connection is suspicious.

6. The method of claim 1, wherein the host emulator is a virtual machine, and wherein configuring the host emulator includes configuring the virtual machine to emulate a portion of an operating system used by the production device and to emulate a portion of a service provided by the production device.

7. The method of claim 1, wherein the connection is stalled in response to determining that the connection has not been terminated.

8. The method of claim 1, wherein configuring the host emulator includes configuring the host emulator to respond to address resolution requests directed to the IP address.

9. The method of claim 1, wherein redirection of the second connection does not use network address translation.

10. The method of claim 1, wherein the host emulator emulates an interface profile of the production device, wherein an internal view of the interface profile is a same view as an external view of the interface profile, wherein the external view is visible from the network, and wherein the internal view is visible when logged in to the host emulator.

11. The method of claim 1, further comprising:
configuring a virtual switch to accept packets from the client device and to direct the packets to the host emulator, wherein requesting redirection includes sending a request to a physical switch to redirect the reconnection request to the virtual switch, and wherein the virtual switch directs the reconnection request to the host emulator.

12. A network deception system comprising:
one or more processors; and
a non-transitory computer-readable medium including instructions that, when executed by the one or more processors, cause the one or more processors to perform operations including:
receiving an indication that a connection is suspicious, wherein the connection is a protocol-based network connection between a client device and a production device in a network, and wherein the production device has an Internet Protocol (IP) address;
stalling the connection to divert communications over the connection to a decoy host on a host emulator, wherein the connection is stalled in response to receiving the indication, wherein stalling causes the client device to terminate the connection;
receiving a reconnection request for the client device to reconnect to the production device, wherein the reconnection request is received after the connection is stalled;
determining a configuration of the production device;
configuring the host emulator using the configuration, wherein configuring the host emulator includes assigning the IP address of the production device to the decoy host, and wherein, when configured, the decoy host has a similar hardware and software configuration as the production device; and
requesting redirection of the reconnection request to the host emulator, wherein requesting redirection facilitates a second connection between the client device and the host emulator, and wherein the host emulator enables an appearance of a successful intrusion into the production device by the second connection.

13. The network deception system of claim 12, wherein the connection is stalled on behalf of the production device.

14. The network deception system of claim 12, wherein, after configuring the host emulator, both the host emulator and the product device are configured with the IP address.

15. The network deception system of claim 12, wherein a physical switch connects the network with a virtual switch, wherein the host emulator is connected to the virtual switch, and wherein the physical switch determines whether to forward packets for the IP address to the network or the virtual switch.

16. The network deception system of claim 15, wherein the non-transitory computer-readable medium further includes instructions that, when executed by the one or more processors, cause the one or more processors to perform operations including:
configuring the physical switch to divert packets sent by the client device, wherein a packet for the IP address that is sent by the client device is diverted to the virtual switch, wherein a packet for the IP address that is sent by a different client device is forwarded to the network, and wherein the physical switch is configured in response to receiving the indication that the connection is suspicious.

17. The network deception system of claim 12, wherein the host emulator is a virtual machine, and wherein configuring the host emulator includes configuring the virtual machine to emulate a portion of an operating system used by the production device and to emulate a portion of a service provided by the production device.

18. The network deception system of claim 12, wherein the connection is stalled in response to determining that the connection has not been terminated.

19. The network deception system of claim 12, wherein configuring the host emulator includes configuring the host emulator to respond to address resolution requests directed to the IP address.

20. The network deception system of claim 12, wherein redirection of the reconnection request does not use network address translation.

21. The network deception system of claim 12, wherein the host emulator emulates an interface profile of the production device, wherein an internal view of the interface profile is a same view as an external view of the interface profile, wherein the external view is visible from the network, and wherein the internal view is visible when logged in to the host emulator.

22. A computer-program product tangibly embodied in a non-transitory machine-readable storage medium, including instructions that, when executed by one or more processors, cause the one or more processors to:
  receive an indication that a connection is suspicious, wherein the connection is a protocol-based connection between a client device and a production device in a network, and wherein the production device has an Internet Protocol (IP) address;
  stall the connection to divert communications over the connection to a decoy host on a host emulator, wherein the connection is stalled in response to receiving the indication, wherein stalling causes the client device to terminate the connection;
  receive a reconnection request for the client device to reconnect to the production device, wherein the reconnection request is received after the connection is stalled;
  determine a configuration of the production device;
  configure the host emulator using the configuration, wherein configuring the host emulator includes assigning the IP address of the production device to the decoy host, and wherein, when configured, the decoy host has a similar hardware and software configuration as the production device; and request redirection of the reconnection request to the host emulator, wherein requesting redirection facilitates a second connection between the client device and the host emulator, and wherein the host emulator enables an appearance of a successful intrusion into the production device by the second connection.

23. The computer-program product of claim 22, wherein the connection is stalled on behalf of the production device.

24. The computer-program product of claim 22, wherein, after configuring the host emulator, both the host emulator and the product device are configured with the IP address.

25. The computer-program product of claim 22, wherein a physical switch connects the network with a virtual switch, wherein the host emulator is connected to the virtual switch, and wherein the physical switch determines whether to forward packets for the IP address to the network or the virtual switch.

26. The computer-program product of claim 25, further including instructions that, when executed by the one or more processors, cause the one or more processors to:
  configure the physical switch to divert packets sent by the client device, wherein a packet for the IP address that is sent by the client device is diverted to the virtual switch, wherein a packet for the IP address that is sent by a different client device is forwarded to the network, and wherein the physical switch is configured in response to receiving the indication that the connection is suspicious.

27. The computer-program product of claim 22, wherein the connection is stalled in response to determining that the connection has not been terminated.

28. The computer-program product of claim 22, wherein configuring the host emulator configuring the host emulator to respond to address resolution requests directed to the IP address.

29. The computer-program product of claim 22, wherein redirection of the second connection does not use network address translation.

30. The computer-program product of claim 22, wherein the host emulator emulates an interface profile of the production device, wherein an internal view of the interface profile is a same view as an external view of the interface profile, wherein the external view is visible from the network, and wherein the internal view is visible when logged in to the host emulator.

* * * * *